Patented Oct. 16, 1928.

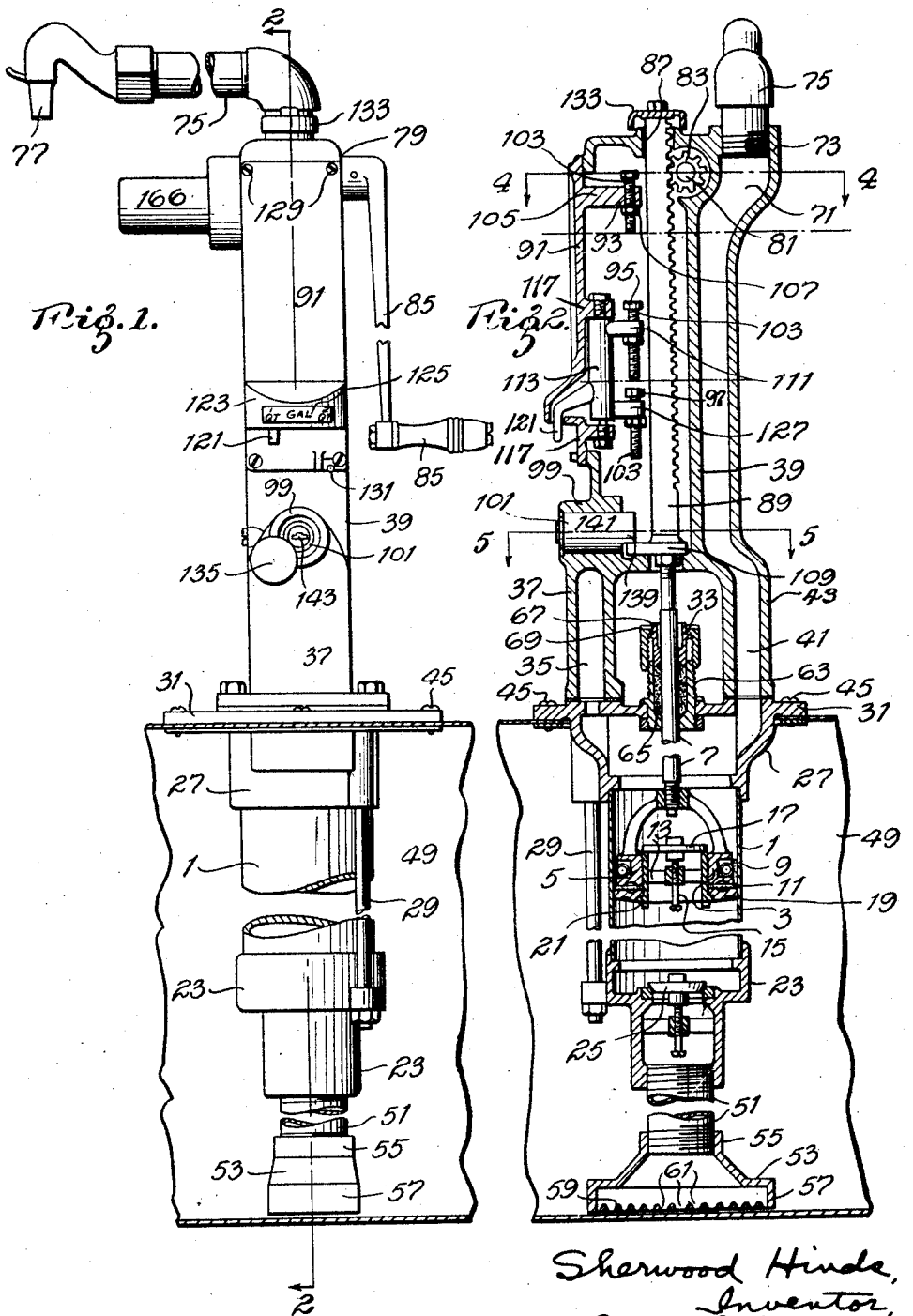

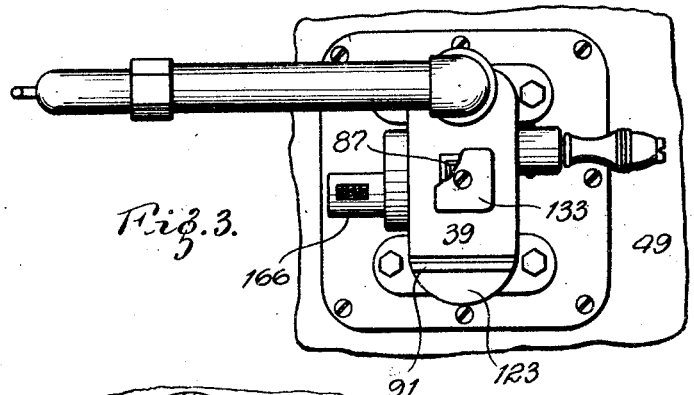
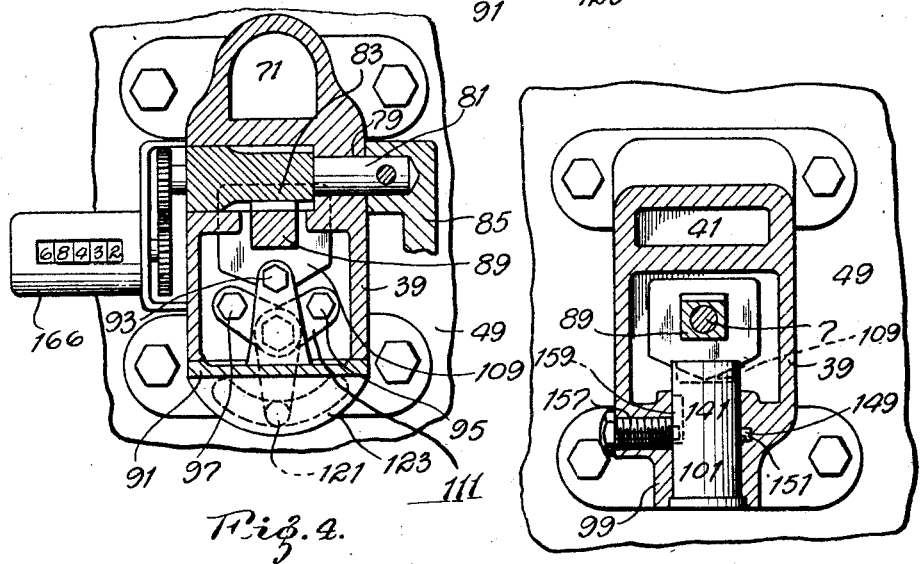
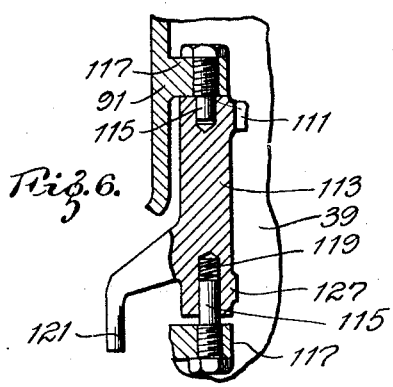

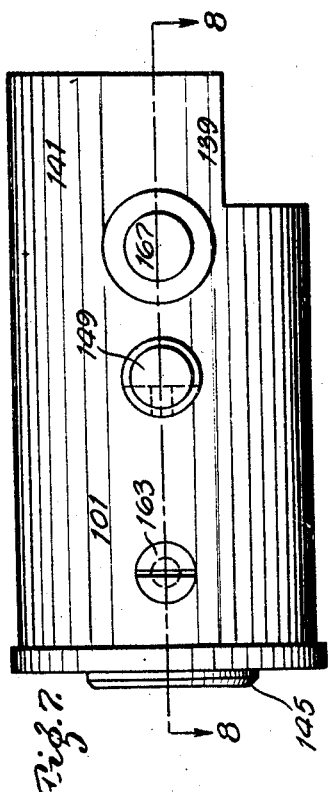
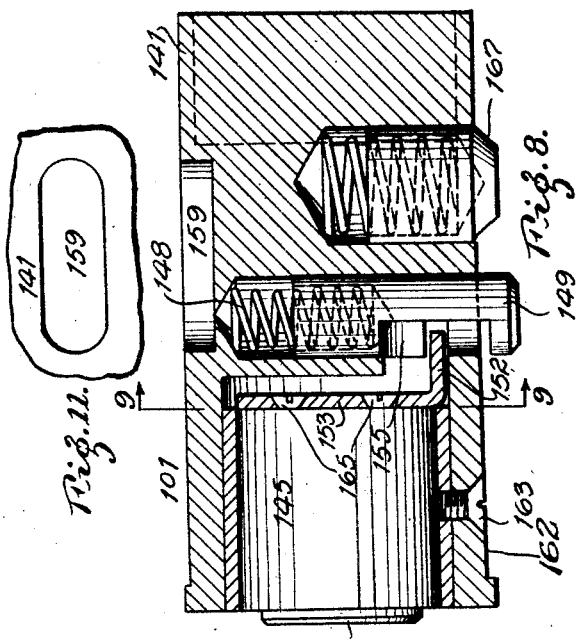
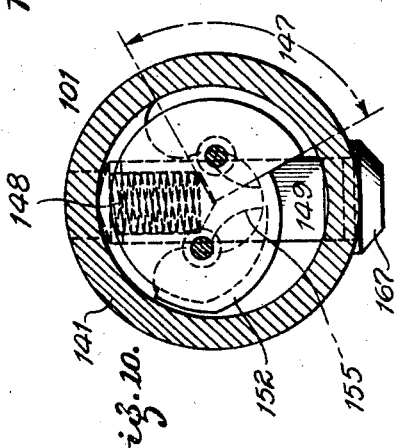
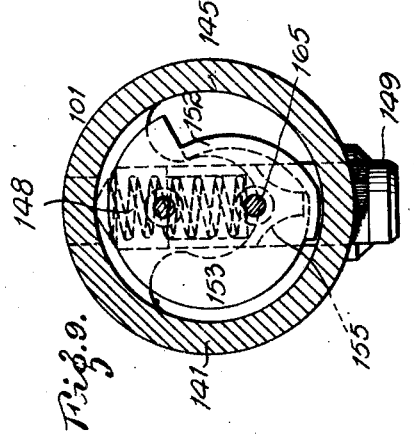

1,688,314

UNITED STATES PATENT OFFICE.

SHERWOOD HINDS, OF RICHMOND HEIGHTS, MISSOURI, ASSIGNOR TO ST. LOUIS PUMP & EQUIPMENT COMPANY, OF ST. LOUIS, MISSOURI, A CORPORATION OF MISSOURI.

DISPENSING APPARATUS.

Original application filed January 28, 1921, Serial No. 440,796. Divided and this application filed May 13, 1922. Serial No. 560,576.

This invention relates to mechanical dispensing apparatus, and with regard to certain more specific features, to liquid-handling devices.

This application is a division of my patent application, Serial Number 440,796, filed January 28, 1921, issued as Patent No. 1,574,887, dated March 2, 1926.

Among the several objects of the invention may be noted the provision of compact and accurate apparatus to determine the quantity of liquid passing through a pump; and the provision of a measuring pump of few parts, not liable to derangement during severe service conditions, and one easily disassembled for inspection or repair. Other objects will be in part obvious and in part pointed out hereinafter.

The invention accordingly comprises the features of construction, combinations of elements, and arrangements of parts, which are exemplified in the construction hereinafter described and a scope of the application of which will be indicated in the following claim.

In the accompanying drawings, in which are shown one or more possible embodiments of this invention, Fig. 1 is a front elevation;
Fig. 2 is a transverse vertical section on the line 2—2 of Fig. 1;
Fig. 3 is a top plan;
Fig. 4 is a horizontal section on the line 4—4 of Fig. 2;
Fig. 5 is a horizontal section on the line 5—5 of Fig. 2;
Fig. 6 is an enlarged detail elevation, partly in section;
Fig. 7 is a right side elevation of a lock-barrel;
Fig. 8 is a horizontal section on the line 8—8 of Fig. 7;
Fig. 9 is a transverse vertical section on the line 9—9 of Fig. 8.
Fig. 10 is a similar view showing the parts in a different position; and
Fig. 11 is a fragmentary left side elevation of the lock-barrel.

Similar reference characters indicate the corresponding parts throughout the several views of the drawings.

Referring now more particularly to Figs. 1 and 2 of the accompanying drawings, there is illustrated a base comprising a cylinder 1 in which is mounted a reciprocating plunger 3 (Fig. 2) comprising an annular crib 5 threaded upon a rod 7 and grooved to receive a helical spring 9 that tends to expand radially of the crib, thereby to force outwardly against the inner wall of the cylinder the annular member 11 of leather or other flexible material, which preserves a tight fit between plunger and cylinder, at least during the upward or working stroke. Within the annular crib is threaded a sleeve 13 having a spider provided with a central bearing extending axially of the cylinder and concentric therewith, to support the sliding stem 15 of the valve 17. The latter remains closed during the upward or working stroke, and rises with respect to the crib and sleeve on the downward stroke, thereby acting as a check valve. A ring or washer 19 is located immediately beneath the horizontal part of the flexible member 11 to hold the latter in position, and is itself retained in place by the flange 21 on the sleeve.

Beneath the cylinder per se is an annular casting 23 that supports it and also houses a lower valve 25 generally similar in construction to the upper valve 17. The lower valve opens on the upward stroke of the pump, and seats itself at or about the end of the upward movement of the pump, remaining closed until the beginning of the next upward movement.

The cylinder is held between the lower casting 23 and the upper casting 27. The two castings are held together by means of tension rods 29 (Figs. 1 and 2).

The upper casting 27 is approximately annular, with a horizontal upper surface 31 that is perforated at three places. The central perforation is for the rod 7 and its bearing 33 (Fig. 2). The front perforation (at the left in Fig. 2) communicates with the expansion chamber 35 in the hollow front leg 37 of the bracket or casing or housing 39 that supports and encloses a number of the elements in the upper part of the apparatus. The rear perforation (at the right in Fig. 2) communicates with the discharge chamber 41 in the hollow rear leg 43 of the bracket 39. The upper surface 31 of the upper casting 27 is also extended outwardly beyond the annular portion of the casting and is perforated to receive the bolts or screws 45 by which it may be secured to a suitable support such as the top of a tank 49 in which all parts of the apparatus beneath this level are enclosed.

The lower casting 23 has threaded into it a vertical pipe 51 which at its lower end is threaded into a strainer 53. The latter flares outwardly from its upper portion 55 that receives the pipe, and terminates in a rectangular portion 57, the lower face or surface of which is covered by a grating formed of a series of spaced bars 61 substantially flush with the lowermost portion of the strainer. In service, when the apparatus is so mounted that its base, that is, all parts beneath the plate 31, are within a tank, the pipe 51 is preferably of such length that the lowermost surface of the strainer is a suitable fraction of an inch above the bottom of the tank, leaving simply a clearance commensurate with the viscosity of the liquid to be handled and the desired rate of flow of liquid through the strainer and into the pump. By this construction it is possible to have the pump draw almost all of the liquid that is in the tank, into the pump, before the pump begins to draw air, thereby increasing the portion of the volume of the liquid in the tank available for pumping, as compared with apparatus that does not pump the liquid down to such a low level in the tank.

The bearing 33 above mentioned comprises the annular member 63 recessed to receive the packing material 65, which can be kept tight by means of a gland 67 secured in place by a cap 69 threaded upon the outer surface of the annular member 63. It is to be noted that the bearing is not housed within the bracket, but is open to the atmosphere. This is particularly advantageous where gasoline or similar volatile liquid is used, as any such liquid that escapes through the packing evaporates without forming an explosive mixture.

The bracket 39 serves a number of purposes. Its hollow rear leg 43 (at the right in Fig. 2) provides a discharge passage 41 communicating with a passage 71 (Fig. 2) extending upwardly and terminating in a threaded socket 73 for the reception of a discharge pipe 75 (Figs. 1 and 2) which leads to a suitable terminal 77. A second feature of the bracket is the expansion chamber 35 above referred to, in the front leg 37 (at the left in Fig. 2). A third feature is the bearing 79 (Figs. 1 and 4) in the upper portion of the bracket, for the shaft 81 on which the pinion 83 (Figs. 2 and 4) and handle 85 are secured. A fourth feature is the open air-space around the plunger-rod bearing 33, above referred to. A fifth feature is the rectangular aperture 87 (Fig. 2) in the top of the bracket, to guide the vertically reciprocating rack 89 that is secured at its lower end (Figs. 2 and 5) to the plunger rod 7. A sixth feature is the front aperture to which is affixed the front plate 91 (Figs. 1, 2 and 4) carrying the independently adjustable quantity stops that limit the upward movement of the rack.

Three sets of stops are illustrated, the upper one 93 (Figs. 2 and 4) corresponding to the rated capacity of the pump, in this instance one gallon, and the middle and lower stops corresponding to convenient fractions of such capacity, in this instance two quarts and one quart, respectively. A further feature of the bracket is the horizontal bearing 99 in the front face of the bracket (at the left in Fig. 2) for the reception of the lock 101.

The upper quantity stop 93 (Figs. 2 and 4) comprises a screw 103 threaded upon a bracket 105 extending rearwardly from and integral with the front plate 91. A locking device such as the nut 107 is provided so that the screw 103 can be secured in place by the municipal or other official in charge of testing of such apparatus, after he has determined by experiment just what the position of the screw should be in order that the pump may deliver its rated capacity, by moving the rack upwardly from its lowermost position indicated in Fig. 2 until the lug 109 engages the lower end of the screw, as indicated by the uppermost dotted lines in Fig. 2.

The middle quantity stop 95 (Figs. 2 and 4) comprises a screw 103 threaded upon a bracket 111 extending from and integral with a vertical sleeve 113 journaled upon a pair of studs or bolts 115 threaded into brackets 117 integral with the front plate 91. In order that the sleeve 113 may be kept at a definite level, and also prevented from accidental displacement, a compression spring 119 is housed in the lower bore in the sleeve, and tends to force the sleeve upwardly so that its upper surface is always in contact with the lower surface of the upper bracket 117. This makes it unnecessary to provide any precise amount of clearance between the sleeve and the brackets 117, and protects the sleeve and its associated parts against accidental displacement. This middle quantity stop 95 is adjustable as to height independently of the upper stop 93. Its engagement or non-engagement with the lug 109 depends on the angular position of the sleeve 113, and this in turn is governed by the position of a quantity handle 121 (Figs. 1, 2, 4 and 6) integral with the sleeve. This quantity handle extends outside the front plate 91 and is thus accessible to the operator. An apron 123 (Figs. 1 and 4) formed on the front plate protects the aperture through which the handle passes, against ordinary rains and thus makes this part of the apparatus substantially waterproof. This apron also serves as a support for a small plate 125 (Fig. 1) bearing legends indicating the several quantities that correspond to the respective quantity stops,—in this instance 1 Qt, 2 Qt and 1 Gal.

The lower quantity stop 97 (Figs. 2 and 4) comprises a screw 103 threaded upon a bracket 127 extending from and integral with the vertical sleeve 113. As is shown in Fig. 4, the middle bracket 111 and its quantity stop 95 are disposed at an angle with relation to the lower bracket 127 and its quantity stop 97.

The two brackets are so positioned with respect to the quantity handle 121 that when the latter is in its left-hand position, corresponding to the legend 1 Qt, the lower quantity stop 97 extends in a rearward direction so as to engage the lug 109 and stop the upward movement of the rack at the height (the lower dotted lines in Fig. 2) corresponding to a discharge of one quart of liquid from the apparatus. The middle quantity stop is at this time to the right (Fig. 4) of the rearward position.

When the quantity handle 121 is in its right-hand position, corresponding to the legend 2 Qt, the middle quantity stop 95 extends in a directly rearward direction so as to engage the lug 109 and stop the upward movement of the rack at the height (the middle dotted lines in Fig. 2) corresponding to a discharge of two quarts of liquid from the apparatus. The lower quantity stop is at this time to the left (Fig. 4) of the rearward position and thus does not stop the upward movement of the rack.

When the quantity handle 121 is in its middle position, corresponding to the legend 1 Gal, the parts are as shown in Fig. 4, that is, the middle quantity stop 95 is to the right of the rearward position and the lower quantity stop 97 is to the left of the rearward position, so that neither of them engages the lug 109 or stops the upward movement of the rack. The rack thus can be moved upward through its full stroke, until its lug is engaged by the upper quantity stop 93 which occurs at the height (the upper dotted lines in Fig. 2) corresponding to the discharge of one gallon of liquid from the apparatus.

It is clear that more or less than two intermediate fractional quantity stops may be provided, as desired, the selective engagement of the rack lug by one or the other of the intermediate stops being insured by having the several stops disposed at different angular displacements from the plane of the plate, as indicated above in connection with two such stops.

When the official in charge of setting or approving the setting of the quantity stops has adjusted the stops and locked them in their respective adjusted positions by means of the lock-nuts 107, the front plate is applied to the bracket, is secured thereto by screws 129, and then sealed in position by suitable means such as are illustrated conventionally at 131.

The lock 101, above mentioned, normally prevents the raising of the rack. The rack when in its lowermost or normal position as indicated in Fig. 2, is engaged at lug 109 by the projection 139 at the rear of the sliding barrel 141 so as to prevent the rack from being raised from such position.

In order to raise the rack, the operator first inserts a key (not shown) in the keyhole 143 (Fig. 1) in the rotating part 145 of the lock. The insertion of the key operates the tumblers, which are not shown in detail as they form no feature per se of the present invention. The key is then turned clockwise (Figs. 1, 9 and 10) through approximately the angle 147 (Fig. 10) from the locked position shown in Figs. 5, 8 and 9 to the unlocked position shown in Fig. 10. Initially, in the locked position illustrated in Figs. 5, 8 and 9, the compression spring 148 forces the bolt 149 outside the lock barrel and into a recess 151 (Fig. 5) in the bearing 99. While the bolt is in this recess it is not possible to move the barrel. The turning of the key clockwise (Figs. 1, 9 and 10) from the Fig. 9 or locked position to the Fig. 10 or unlocked position rotates the flanged portion 152 (Fig. 8) of the cam 153 on the rotating part 145, and the cam portion 152 engages the follower portion 155 (Figs. 8 and 9) of the bolt and draws the bolt into the barrel, against the force of the compression spring 148, the parts then assuming the position shown in Fig. 10. It is now possible to pull the barrel bodily toward the operator, that is, toward the left in Figs. 2, 7 and 8, through the distance permitted by the screw 157 (Fig. 5) cooperating with the slot 159 (Figs. 8 and 11) in the barrel 141. This distance is sufficient to pull the projection 139 from the barrel out of the path of movement of the lug 109 on the rack, so that the operator can now raise the rack by turning the operating handle 85 in a clockwise direction (Fig. 2).

As soon as the barrel has been pulled toward the operator to unlock the rack, the operator if he so wishes can return the key to its initial position and withdraw it from the keyhole. This removes the cam flange 152 from engagement with the follower 153 on the bolt, but the bolt does not return to locking position because it is not in juxtaposition to the recess 151. When the operator has finished using the apparatus he simply pushes the lock barrel in until the bolt snaps into recess 151, whereupon the lock is in its original condition.

The lock is thus at a convenient height, and in a convenient position at the front of the apparatus, and by its operation directly upon an element integral with the rack it effectively prevents any unauthorized movement of the rack. Any suitable commercial tumbler mechanism may be used by simply drilling a hole in its non-rotating shell 162 (Fig. 8) for the reception of a screw 163 to secure the shell to the barrel, and by drilling holes in the rotating part 145 (Fig. 8) for the reception of screws 165 to secure the cam 153 thereto. The tumbler mechanism may thus be readily replaced, as is often desirable when a key has been lost.

The barrel is held against accidental displacement when in unlocked position, by the plug 167 (Fig. 8), which is spring-pressed outwardly against the inner surface of the bearing 99, to provide friction between barrel and bearing.

The apparatus is substantially waterproof. The cap 133 secured to the top of the rack covers the rectangular aperture 87 in the top of the bracket, through which the rack passes. The apron 123 above mentioned covers the aperture in the front plate provided for the quantity handle. The lock 101 is normally flush with the outer surface of the bracket and is exposed only at its keyhole, which may be covered by the swinging plate 135 (Fig. 1) if desired. If no lock is used, a disc (not shown) is snapped into the bearing 99 to close the aperture. The plunger rod bearing 33 protects the cylinder from moisture from without, and the other parts of the apparatus that are liable to derangement through moisture or rust are all housed in the bracket.

The totalizer 166 is of conventional form, with an overrunning clutch (not shown).

From the above it will be seen that the several objects of the invention are realized, and other advantageous results attained.

As various possible embodiments might be made of the above inventions and various changes might be made in the embodiment above set forth it is to be understood that all matter herein set forth or shown in the accompanying drawings is to be interpreted as illustrative and not in a limiting sense.

I claim:

In apparatus of the class described, in combination, a housing, a rack provided with a lug, means for moving the rack, a member mounted on the housing and adapted to be sealed thereon and having an apron protecting an aperture therein against weather, a shaft mounted on said member and carrying one or more separately adjustable intermediate stops adapted selectively to engage the lug of said rack, an adjustable stop mounted on the member and adapted to engage said lug of said rack, a handle projecting through said aperture and connected to said shaft to rotate one or the other of the intermediate stops into the path of the lug on said rack as desired, means for securing said housing upon a cylinder, a piston within the cylinder and a piston rod connected to said rack.

In testimony whereof, I have signed my name to this specification this 10th day of May, 1922.

SHERWOOD HINDS.